June 25, 1963 C. W. VOGT 3,095,133
RECEPTACLE AND METHOD OF MAKING THE SAME
Filed May 10, 1957
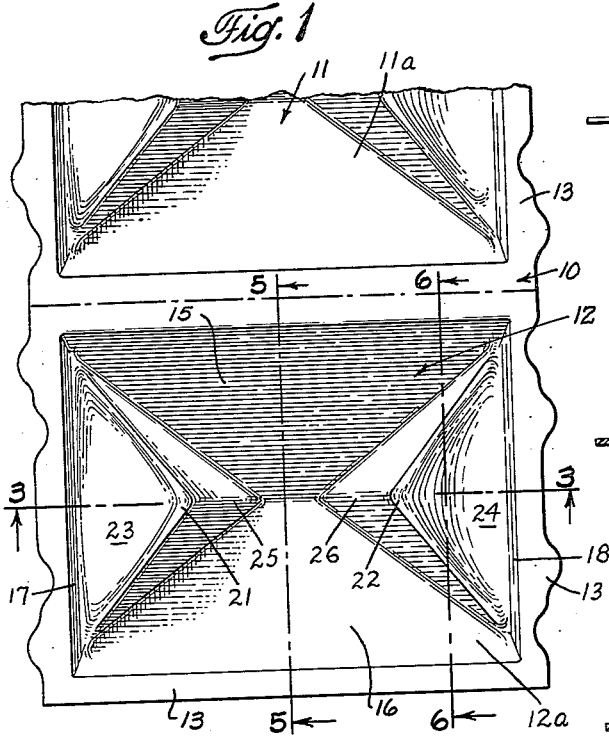
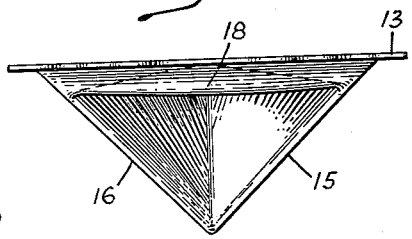
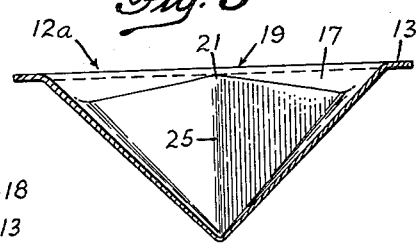
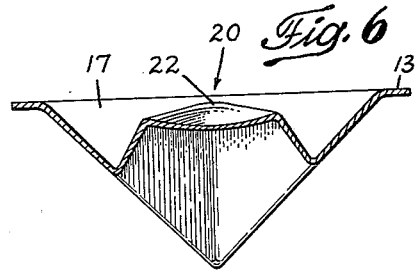
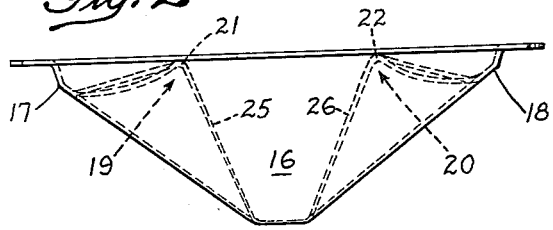
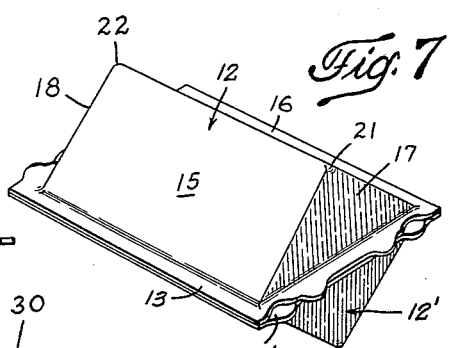
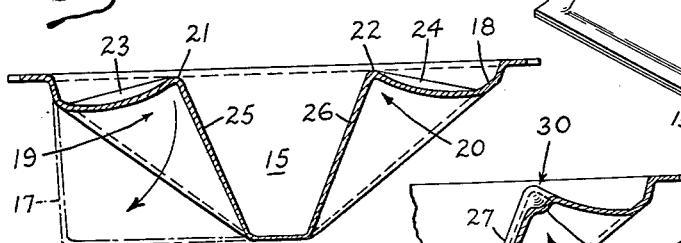
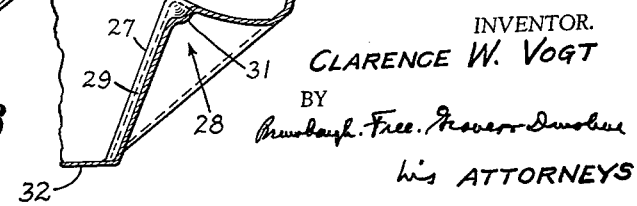
INVENTOR.
CLARENCE W. VOGT
BY
his ATTORNEYS United States Patent Office
3,095,133
Patented June 25, 1963

3,095,133
RECEPTACLE AND METHOD OF MAKING
THE SAME
Clarence W. Vogt, Weston, Conn.
(Rte. 4, Westport, Conn.)
Filed May 10, 1957, Ser. No. 658,300
8 Claims. (Cl. 229—2.5)

This invention relates to improvements in receptacles for receiving moldable plastic or finely divided materials such as butter, margarine, shortening, flour, cake and pie mixes, and other products and articles, and it relates particularly to pre-formed nestable receptacles for such materials, products and articles.

In the manufacture of nestable receptacles, it is necessary to provide the side walls of the receptacle with a downward or converging taper sufficient to enable the receptacles to be slipped one inside of the other so that they will occupy a very much smaller space when nested than when separated.

In the manufacture of liners or receptacles by vacuum and/or pressure molding techniques, either a male mold or a female mold may be used. When a female mold is used, a sheet of thermoplastic material, such as polyethylene, polyvinyl resins, a high impact and bilaterally stretched polystyrene plastic or the like is clamped around the periphery of the mold cavity. The sheet is heated to soften it and render it plastic and stretchable and it is then subjected to vacuum and/or fluid pressure which causes the sheet of material to stretch and conform itself to the shape of the mold cavity. During such a stretch-forming operation, the entire stretching action takes place in the unclamped area. Due to this fact, the sheet stretches substantially in proportion to the unsupported length of the sheet, that is, as the portions come into contact with the mold, they cease to stretch, while the remainder of the sheet continues to stretch so that those portions which must be displaced the greater distance are stretched to the greatest extent. For this reason, when receptacles are made by pressure or stretch-forming operations, the corner portions of the resulting receptacles are stretched the most and are the thinnest and the weakest. Inasmuch as the corners receive the greatest wear and are most likely to be subjected to impact or abrasion, it is usual to make receptacles of a heavy gauge material to render the corners thick enough to avoid easy damage thereto.

When a male mold is used, the moldable sheet is draped over the mold and the material is clamped outside the mold edges. The sheet is then softened and subjected to fluid pressure and/or vacuum to conform it to the mold. The resulting receptacles are not readily nestable unless the walls thereof are formed with a taper so great that substantial capacity is lost therefrom. Moreover, the sheet material clamped outside the mold must be trimmed off and constitutes a serious waste of material.

In accordance with the present invention, I have provided a method of producing receptacles from a thermoplastic or stretchable sheet material in which the corner portions of the receptacles can be made thicker and stronger than their walls so that the package made from such a receptacle is rendered much more durable and resistant to impact and abrasion. In manufacturing or molding the individual receptacles, they are shaped to enable them to nest with other similar receptacles, so that a large number of such receptacles occupy only a very small space when nested. The new receptacles can be filled by hand or by means of machines of many different types such as those disclosed in my applications Serial Nos. 601,030, filed July 30, 1956, 595,249, filed July 2, 1956, and 585,775, filed May 18, 1956, and such filling is greatly facilitated by the structure of the receptacles.

Moreover, the receptacles can be used for packaging many different kinds of articles or solid, semi-solid, fluent or plastic products.

For a better understanding of the present invention, reference may be had to the accompanying drawings in which:

FIGURE 1 is a plan view of a portion of a strip or sheet having formed therein a plurality of liners or receptacles of the type embodying the present invention;

FIGURE 2 is a view in elevation of a portion of the strip or sheet;

FIGURE 3 is a view in section taken on line 3—3 of FIGURE 1;

FIGURE 4 is a side elevational view on one of the receptacles or liners of the strip;

FIGURE 5 is a view in cross section taken on line 5—5 of FIGURE 1;

FIGURE 6 is a view in cross section taken on line 6—6 of FIGURE 1;

FIGURE 7 is a perspective view of a filled and closed receptacle of the type embodying the present invention; and FIGURE 8 is a view in section taken through one end of a modified type of receptacle.

The present invention provides receptacles or liners which do not have many of the disadvantages of prior receptacles of the stretch-formed type. Thus, as shown in FIGURES 1 to 6, a sheet 10 of a suitable thermoplastic material such as polyethylene, polyvinyl resin, polystyrene or the like, is stretch-formed to provide a series of receptacles 11, 12, etc., which may be so constructed and arranged that the receptacles can be readily nested with other similar receptacles or groups of the receptacles formed in sheets can be nested with other groups. If desired, the sheet material may be unilaterally or bilaterally stretched in a heated condition and, without cooling, stretch-molded to form the receptacles. As shown in FIGURE 7 of the drawings, a filled package may include two similar receptacles 12 and 12', for example, each of which has a generally prism-like cavity of triangular cross section therein and is provided with a rim portion 13 or 13', these rim portions being adapted to engage and be heat sealed or otherwise united to enclose the material packaged therein. By varying the cross-section shapes of the cavities 11a, 12a, in the receptacles 11 and 12, products of various shapes can be packed therein.

The cavities 11a, 12a, etc., are formed initially in the sheet 10 by a stretch-forming operation, as described above. The mid-portion of each cavity is defined by the downwardly converging side walls 15 and 16 and the end walls 17 and 18. Portions of each side wall 15 and 16 and the end walls 17 and 18 are directed inwardly to form re-entrant corner portions 19 and 20 extending into the cavity 14 and having their apices 21 and 22 substantially in or slightly below the plane of the rim 13. The re-entrant corner portions 19 and 20 are of pyramidal (three-sided) shape and are shaped in a mold having complementary projections at its ends. The shape of the mold projections is such as to impart a slightly concave shape to the upper portions 23 and 24 of the re-entrant corner portions and to form downwardly converging inner edges 25 and 26 enabling the receptacles to be nested. Preferably, the apices 21 and 22 of the corner portions are slightly rounded, although they can be sharp, if desired.

The shape of the corners and the bottom of the receptacle may be improved somewhat if the inwardly extending edge 27 of each of the re-entrant corners, shown in FIGURE 8, is provided with a groove 29 of rounded concavo-convex cross-section and the apex of the corner is formed with a reversely domed portion or dimple 31. When the corner is deflected or displaced outwardly, the groove 29 will become a continuation of the V-shaped bottom edge 32 of the receptacle, while the dimple 31 will form a smoothly-rounded corner on the receptacle.

Displacement and outward projection of the re-entrant corner portions may be accomplished during the filling of the package by the pressure exerted in inserting the filling material into the liner or receptacle by inserting into the receptacle a forming die, ram or plunger of a suitable contour.

In the apparatuses of the type shown in my application Serial Nos. 601,030, filed July 30, 1956; 595,249, filed July 2, 1956, and 585,775, filed May 18, 1956, the air pressure used for supplying filling material to the receptacle is sufficient to extend the re-entrant corners. At the same time, filling is facilitated because not as much air need be vented from the receptacle during filling as is the case with prior types of receptacles. In other words, a substantial advantage is obtained in tight filling a receptacle having re-entrant corners over fully formed receptacles not having such re-entrant corners.

Production of receptacles with re-entrant corners also enables control of the thickness of the corners of the receptacle. Thus, when the heated sheet of material is stretched into the mold by fluid pressure applied to it while it is clamped at the portion corresponding to the rim 13, the sheet will first come into contact with the apices of the inward projections in the mold corresponding to the apices 21 an 22 of the re-entrant corners. Engagement of the plastic sheet with the colder mold will restrain the sheet and in some instances cool and stiffen the sheet at zones corresponding to the apices 21 and 22 and prevent the sheet from stretching at these zones so that the corners corresponding thereto remain substantially as thick as the initial thickness of the sheet. The rest of the film material remains unsupported and out of contact with the mold and stretches and becomes thinner as it stretches. Inasmuch as the thinner wall portions of the receptacle are somewhat better shielded from abrasion and impact than the corners, their thinness is of no disadvantage. A practical advantage arising from control of the corner thickness is that thinner sheet material and a much smaller area of the sheet material can be used for making receptacles of a given capacity than would be the case if the corners were formed in the usual way. It has been found that a satisfactory receptacle can be made of material about two-thosuandths of an inch thick, while heretofore it was deemed necessary to use material four or five-thousandths of an inch thick in order to provide the necessary strength at the corners of a receptacle of comparable capacity.

As shown in FIGURE 3, the upper portions of the end walls 17 and 18 of the receptacle are tapered inwardly about 15° more or less so that the articles can nest readily one within the other. The space occupied by a stack of such nested receptacles is only about 2% of the space occupied by the receptacles when they are separated. When the re-entrant corners are pushed out along dotted lines of FIGURE 3, only sufficient end taper is left to permit filled receptacles to be readily removed from a filling machine after the receptacle is filled.

It will be understood that the receptacles may be formed of various types of materials which are susceptible to stretch or vacuum forming but they should be formed of a type of material which is resilient or flexible when cold so that the re-entrant corners can be forced outwardly to bring the package to its finished shape.

When a product has been introduced or filled into the cavity of a receptacle, the cavity can be closed by means of another similar receptacle, as shown in FIGURE 7, or by a flat sheet or by a receptacle or cover of a different shape, adhered to the rim of the receptacle.

It will be understood further that the cavities in the receptacles can be made triangular with the sides thereof of unequal length so that when a pair of such receptacles are joined in superimposed relation, they provide a space of rectangular cross-section therebetween. Cavities of other cross-sectional shapes may also be provided with re-entrant corner portions of greater thickness than the walls of the receptacles.

From the foregoing, it will be apparent that the receptacles and the method of making the same are susceptible to considerable modification and, therefore, the form of the invention disclosed herein should be considered illustrative and not as limiting the scope of the following claims.

I claim:

1. A receptacle comprising a sheet of stretchable material having a plurality of angularly-related wall portions defining a cavity therein having an open-mouth for receiving a product, and a portion of the sheet at a junction of at least three wall portions forming a re-entrant corner portion having a continuous wall converging to an apex extending into said cavity, said re-entrant corner portion being displaceable out of said cavity to direct said apex outwardly and dispose said continuous wall substantially in the planes of said at least three wall portions to form a closed corner of said cavity.

2. The receptacle set forth in claim 1 in which the apex of the re-entrant corner portion is thicker than the portions of the sheet material adjacent thereto.

3. A receptacle comprising a sheet of stretchable material having an open-top cavity therein with angularly-related side walls and end walls, and re-entrant substantially pyramidal corner portions extending into said cavity at the junctions of said side and end walls, each of said corner portions having a continuous wall composed of portions of said side and end walls, said corner portions being displaceable outwardly to render the interior of said cavity prism-like in shape and form closed bottom corners for said cavity.

4. The receptacle set forth in claim 3 in which the side walls and end walls taper to fit within a cavity of a similar receptacle.

5. The receptacle set forth in claim 3 in which the cavity is of triangular cross section.

6. The receptacle set forth in claim 3 in which the pyramidal corner portions have apices which are thicker than said side and end walls adjacent thereto.

7. The combination set forth in claim 3 in which the open top of the cavity has a peripheral outwardly extending rim integral therewith.

8. A receptacle comprising a sheet of flexible, thermoplastic material having side walls and end walls defining a cavity in said sheet and re-entrant corner portions extending into said cavity at the junctions of said side and end walls, each re-entrant corner portion having an apex and continuous walls composed of portions of said side and end walls, converging toward said apex, said corner portions being displaceable outwardly to increase the capacity of said receptacle and form closed bottom corners for said cavity.

References Cited in the file of this patent

UNITED STATES PATENTS

| | | |
|---|---|---|
| 593,949 | Mullins | Nov. 16, 1897 |
| 783,059 | Miller | Feb. 21, 1905 |
| 2,003,600 | Lowenfels | June 4, 1935 |
| 2,350,164 | Heymann | May 30, 1944 |
| 2,633,986 | Vogt | Apr. 7, 1953 |
| 2,663,489 | Paige | Dec. 22, 1953 |
| 2,768,106 | Sartakoff | Oct. 23, 1956 |
| 2,834,686 | Reuman | May 13, 1958 |